United States Patent Office 2,904,664
Patented Sept. 15, 1959

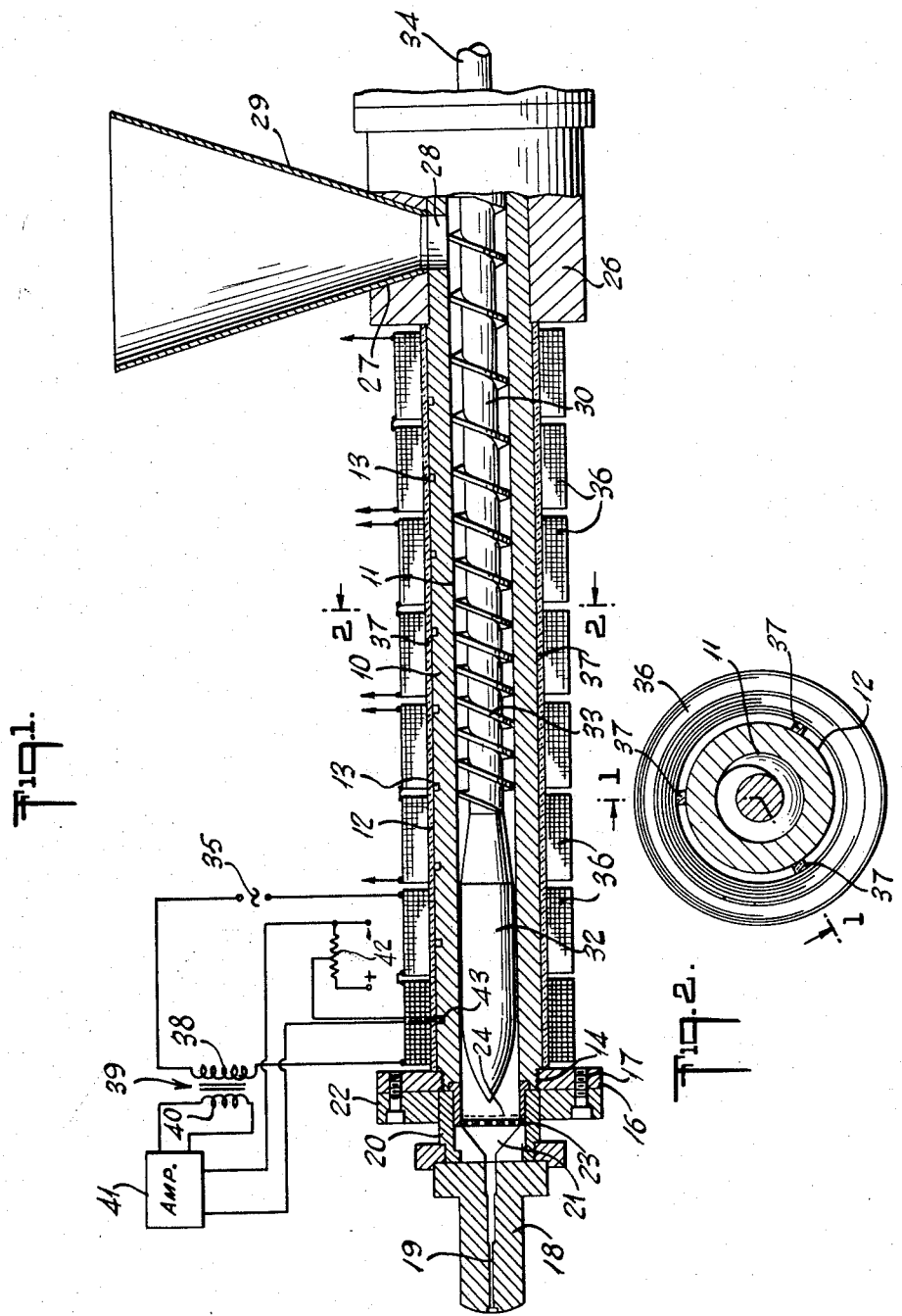

2,904,664

MAGNETIC HEATING IN EXTRUSION APPARATUS

Francis Neill Rothacker, East Orange, N.J., assignor to Sealtron Corporation, Long Island City, N.Y., a corporation of Delaware Application September 25, 1957, Serial No. 686,116

3 Claims. (Cl. 219—10.49)

The present invention relates generally to improvements in apparatus for the extrusion of thermoplastic material, and it relates more particularly to an improved system for heating and controlling the temperature of the thermoplastic material.

In accordance with the conventional methods of forming extruded shapes of synthetic organic thermoplastic material, various types of extrusion devices are employed. These generally include an elongated tubular barrel with which registers a rotating worm of successively smaller pitch which advances the plastic from the feed end of the barrel to the extrusion end thereof. A hopper is located at the feed end of the barrel and communicates with the interior thereof and a heated extrusion die having the desired opening is located at and communicates with the discharge end of the barrel.

In order to effect the satisfactory extrusion of the thermoplastic material, the temperature thereof along the full length of the barrel and at the extrusion die must be very closely controlled. The proper control of the temperature of the thermoplastic material has presented a major problem and the absence thereof accounts for an inferior and rejected product and non-productive out-time of the extrusion equipment. The usual methods for heating the extrusion barrel are either with circulating steam or hot oil or electrically. The steam and hot oil methods are expensive and difficult and of very little flexibility. The conventional method for electrically heating the extruder barrel employs electrical resistance heaters of various types which are located along the length of the barrel. The currents to these heaters are generally regulated to maintain the desired temperatures at the various extruder barrel zones. In many cases, however, the temperature of the extruded material is raised by reason of the energy delivered thereto as a result of the screw frictional losses or due to exothermic reactions so that cooling is required to maintain the optimum temperatures. The cooling is usually accomplished by circulating a heat exchange medium in heat exchange contact with the extruder barrel between the heaters and the interior of the barrel.

It is apparent from the above that the heating and temperature control of an extruder barrel is at its best a costly, complicated, high power consuming operation requiring expensive equipment and highly trained personnel. This is particularly true since the different plastics and operating conditions require different temperature distributions. Furthermore, the conventional electrically heated extruder barrels are generally characterized by the development of hot spots or uneven heating and by very slow cooling.

Another drawback of the conventional plastic extruding machines is the problem of effecting a free flow of the plastic material, generally in the form of granules or pellets, through the hopper into the barrel. By reason of the heating of the hopper by conduction from the hot barrel, the plastic granules or pellets tend to adhere to the hopper walls and impede the flow thereof into the barrel.

It is thus a principal object of the present invention to provide an improved extruder apparatus.

Another object of the present invention is to provide an improved apparatus for the extrusion of synthetic organic thermoplastic materials.

Still another object of the present invention is to provide a plastic extruding apparatus having an improved plastic heating system.

A further object of the present invention is to provide a plastic extruding apparatus having an improved extruder barrel temperature regulating system.

Still a further object of the present invention is to provide an improved plastic extruder having a heating and temperature control system characterized by its ruggedness, simplicity, versatility, high efficiency and low power consumption.

Another object of the present invention is to provide an improved plastic extruder characterized by controlled uniform heating of the plastic and the simple and rapid cooling of the extruder barrel.

Still another object of the present invention is to provide an improved plastic extruder so constructed and provided with a heating system that the free flow of plastic material into said extruder is unimpeded.

The above and further objects of the present invention will become apparent from a reading of the following description, taken in conjunction with the accompanying drawings, wherein Figure 1 is a schematic and longitudinal sectional view of the improved extruding apparatus; and Figure 2 is a sectional view taken along line 2—2 in Figure 1.

In a sense, the present invention contemplates the provision of an improved extrusion apparatus comprising an elongated hollow barrel formed of a magnetic material and having a feed end and a discharge end; means for conveying material from said feed end to said discharge end; means for delivering a thermoplastic material into said barrel at said feed end; an extrusion die located at the discharge end of said barrel; an electrical solenoid registering with said barrel and having an inner surface spaced between ⅛ and ¼ of an inch from the outer surface of said barrel to define a duct through which air may be circulated; and means connecting said solenoid to a source of alternating current at a frequency between 10 and 1000 cycles per second.

Another feature of the present invention resides in the provision of an improved extrusion apparatus comprising an elongated hollow barrel formed of a magnetic material having a feed end and a discharge end; means for conveying material from said feed end to said discharge end; means for delivering a thermoplastic material into said barrel at said feed end; an extrusion die located at the discharge end of said barrel; an electrical solenoid registering with said barrel; said barrel being provided with a portion of enlarged cross section adjacent to its feed end thereof; said solenoid portion of enlarged cross section having a transverse aperture formed therein communicating with the interior of said barrel; and means connecting said solenoid to a source of alternating current at a frequency between 10 and 1000 cycles per second.

Referring now to the drawings, which illustrate a preferred embodiment of the present invention, the numeral 10 generally designates a longitudinally extending extruder barrel of hollow cylindrical configuration which is formed of a magnetic material, such as, for example, ordinary carbon steel or a stainless steel of the magnetic type. The barrel 10 is provided with an inner smooth cylindrical surface 11 of circular transverse cross section and an outer cylindrical surface 12 likewise of circular cross section and is provided with a plurality of longitudinally extending wells 13 for housing temperature responsive elements as will be hereinafter set forth.

The forward or discharge end of the barrel 10 is of slightly reduced cross section and is threaded as at 14. An internally threaded annular flange 16 engages the threaded portion 15 and is provided with circumferentially spaced longitudinally extending tapped openings 17. An extrusion die 18 of conventional construction is provided with a longitudinally extending extrusion opening 19 and a rearwardly directed conduit 20 provided with a funnel shaped guide 21 directed to the extrusion opening 19. The conduit 20 carries an outwardly directed flange 22 which is secured to the barrel flange 16 by means of screws passing through openings formed in the flange 22 and engaged tapped openings 17 in the flange 16. Also carried by the conduit 20 are the usual breaker plates 23 and screens 24.

The transverse cross sectional area of the barrel 10 is substantially increased at the feed end thereof by the provision of a metal sleeve 26 encircling the barrel 10 at the feed end thereof and in tight fitting abutment with the outer surface 12 thereof. The cross-sectional area of the barrel at the feed end thereof, including the barrel per se 10 and the collar or sleeve 26, should preferably be at least two to three times the cross sectional area of the barrel 10. A frustoconical opening 27 is formed in the collar 26 and communicates by way of an opening 28 formed in the barrel 10 with the interior of the barrel. A funnel shaped hopper 29 has its lower end registering with and nesting in the frusto-conical opening 27 and provides a means for feeding the plastic material, which is usually in pellet or granular form, into the interior of the extruder barrel 10.

Disposed within the barrel 10 and extending coaxially therewith is a screw 30 of conventional construction including a leading torpedo 32 and a trailing, advancing and compression screw 33 of varying pitch which decreases approaching the leading end of the screw. Thus, gradually increased pressure is applied to the liquified plastic as it advances along the length of the barrel 10. The screw 30 is provided with a shaft 34 projecting rearwardly through a suitable bushing and driven by the conventional motivating means.

A plurality of solenoids 36 arranged in spaced end-to-end relationship encircle and extend along substantially the full length of the barrel 10. The inner surfaces of the solenoids 36 are spaced from the outer surface 12 of the barrel 10 between ⅛ and ¼ inch by means of a plurality of longitudinally extending spacer elements 37 preferably formed of an insulating heat resistant material, such as asbestos or the like. The confronting faces of the solenoids 36 and the barrel 10 are thus separated by a free space which permits the circulation of air to facilitate the cooling of the barrel and which further heat-insulates the solenoids 36 from the barrel 10 to keep the temperature of the solenoids relatively low. The end-to-end spacing between the solenoids 36 likewise facilitates the circulation of air about the outer barrel surface 12. The distance between the confronting face of the solenoids 36 should be at least twice the distance between the solenoid and the barrel 10 and less than the barrel wall thickness.

Each successive pair of solenoids 36 are connected in series in a similar sense; that is, the turns of the solenoid extend in a common current carrying direction through the controlled winding 38 of a saturable core reactor 39 to a source of alternating current 35 at a frequency between 10 and 1000 cycles per second. This alternating current may be derived directly from the commercial power lines at 60 cycles per second or at the prevailing frequency provided that it falls within the above range. The saturable core reactor 39 is provided with a control winding 40 connected to the direct current output of an amplifier 41.

One of the terminals to the input of the amplifier 41 is connected in series to the resistor element of a potentiometer 42 across which resistor element is applied a suitable D.C. standard voltage. The other terminal of the amplifier input 41 is connected by way of a thermocouple 43 disposed in a well 13 to the arm of the potentiometer 42. It should be noted that a thermostat or other temperature responsive element may be substituted for the thermocouple 43 and the circuit network correspondingly modified as is well known in the art.

The input and output of each amplifier 41 is so fixed that a rise in the temperature of the corresponding temperature responsive element 43 is accompanied by a decrease in the current through the saturable core reactor control winding 40 to thereby increase the impedance of the saturable core reactor controlled winding 30 and decrease the current through the corresponding solenoids 36. Similarly, a drop in the temperature of the element 43 is accompanied by an increase in the current through the control winding 40 to decrease the impedance of controlled winding 39 and increase the current through the solenoids 36. By adjusting the potentiometer 42 or any equivalent circuit, the temperature of the corresponding zone of the barrel 10 may be adjusted. It should be noted that other well known adjustable circuit networks may be employed to control the current through the winding 40 in proper response to the element 43.

The resonant frequency of the groups of solenoids 36 as connected is preferably higher than the frequency of the applied current under all operating conditions. Furthermore, the controlled winding of the saturable core reactors, when no signal is applied to the controlled winding thereof, should preferably resonate at the frequency of the applied alternating current. The consequence of the above is a superior control of the heating of the barrel 10.

The thickness of the wall of barrel 10, for maximum efficiency, should be as small as possible commensurate with the strength requirements of the barrel to withstand the pressure developed within the extruder and should preferably not exceed approximately 40% of the inner diameter of the barrel. The advantages realized by the present improved system for heating the extruder barrel are numerous and radical. The frequency of the applied alternating current and the thickness of the barrel 10 are such that intense heating is effected along the interior surface of the barrel and as a result the temperature gradient radially through the wall of the barrel 10 is such that the heat flow is generally outwardly, the temperature within the barrel 10 being normally higher than the temperature at the outer surface of the barrel. Thus, when the frictional heat generated by the screw 30 is greater than that required to maintain the desired temperatures of the extruded plastic, there is a rapid flow of heat outwardly through the wall of the barrel 10 since the outer surface thereof is generally at a lower temperature than the inner surface thereof and there is no impeding heat insulating material.

Furthermore, when heat is required to be delivered by the heaters to the interior of the barrel 10, the heat losses are likewise relatively low since the heat is generated principally below the outer surface of the barrel 10. This greatly contrasts with the conventional electrical heating wherein the outer surface is at maximum temperature during the heating cycle and heat losses are much greater than with the present improved heating system. In addition, the time required to raise the temperature of the barrel 10 from room temperature to normal operating temperature is much less employing the present heating system than with the conventional electric heating systems. The power requirements for the regulated heating of an extruder barrel employing the present improved system are a small fraction of that required in conventional extruder heating systems.

The trailing solenoid 36 is just forward of the enlarged portion of the barrel 10 defined by the collar 26, so that very little heat is induced in that portion of the barrel anterior to the trailing solenoid 36. As a result, the only heat reaching the trailing end of the extruder is by way of conduction along the barrel 10. Inasmuch as the amount of heat contained in the barrel 10 is relatively low, the temperature of the collar 26 and the hopper 29 is insignificantly raised thereby permitting the free and unimpeded flow of the solid granular or pelletized material in the hopper 29.

In accordance with a specific example of the improved extruder, the barrel 10 from the discharge end to the leading shoulder of the collar 26 is approximately 22 inches long and is formed of a steel tube having an outer diameter of 2¾ inches and an inner diameter of 1½ inches. The outer diameter of the collar 26 is 5½ inches and is approximately 5½ inches long. There are provided eight solenoids 36, each solenoid having 400 turns, being approximately 2¼ inches long and ⅝ inch thick, the inner surfaces thereof being spaced from the outer surfaces of the barrel 10 approximately ⅛ inch and the confronting faces of the successive solenoids 36 being separated approximately ⅜ inch. The leading and trailing series-connected pairs of solenoids are each provided with an individual control regulating circuit network as above described, whereas the intermediate two pairs of series-connected solenoids are connected in parallel and provided with a common current regulating network as above described.

In operating the above extruder in the extrusion of acrylic resins which requires a temperature of approximately 400° F., the three circuit networks were adjusted so as to provide the desired temperature distribution along the length of the barrel, the temperature of the barrel zone heated by the leading and trailing pairs of solenoids 36 being lower than that required by the intermediate zone of the extruder barrel. Under normal operating conditions, the voltage across the leading pair of solenoids is 150 volts and the current is normally 1¾ amperes. The voltage across the two intermediate pairs is 125 volts and the controlled current thereto 2 amperes, and the voltage across the trailing solenoids is 175 volts and 2 amperes. The total power consumption under normal operating conditions is under approximately 900 watts, a small fraction of that required with the conventionally heated extruders. The frequency employed was 60 cycles per second and the line voltage was 220 volts.

While there has been described and illustrated a preferred embodiment of the present invention, it is apparent that numerous alterations and omissions may be made without departing from the spirit thereof. For example, while the barrel 10 has been illustrated as formed of a single piece, it may include a liner in the usual manner. Furthermore, the arrangements of the coils may be varied in accordance with the requirements of the particular extruder and the temperature distribution adjusted to the optimum needs of the extruded plastic.

I claim:

1. An improved extrusion apparatus comprising an elongated hollow barrel formed of a magnetic material and having a feed and a discharge end, means for conveying material from said feed end to said discharge end, means for delivering a thermoplastic material into said barrel at said feed end, an extrusion die located at the discharge end of said barrel, a plurality of longitudinally spaced electrical solenoids registering with and magnetically coupled by said barrel and having inner surfaces spaced from the outer surface of the said barrel, the distance between the confronting faces of successive solenoids being less than the wall thickness of said barrel, and means connecting each of said solenoids to an independently continuously controlled source of alternating current at substantially the same phase and at a frequency between 10 and 1000 cycles per second and each said means including a saturable core reactor having a controlled winding connected in series with said respective solenoid and said source of alternating current and a control winding, and a temperature responsive element located on said barrel and means for applying to said control winding a direct current varying inversely as the temperature of said temperature responsive element, the resonant frequency of said solenoids being higher than said alternating current frequency.

2. An improved extrusion apparatus in accordance with claim 1, wherein the distance between the outer face of said barrel and the confronting faces of said solenoids is at least ⅛ inch.

3. An improved extrusion apparatus in accordance with claim 1, wherein said barrel is provided with a portion of enlarged cross section at the feed end thereof and said solenoid extends to a point short of said portion of enlarged cross section whereby the temperature of said section is less than that of said barrel and including a hopper communicating with said barrel at a point posterior to the leading end of said portion of enlarged cross section.

References Cited in the file of this patent

UNITED STATES PATENTS

| | | |
|---|---|---|
| 2,226,447 | Smith et al. | Dec. 24, 1940 |
| 2,309,496 | Bird et al. | Jan. 26, 1943 |
| 2,541,201 | Buecken et al. | Feb. 13, 1951 |
| 2,721,729 | Van Riper | Oct. 25, 1955 |